Aug. 21, 1923.

M. C. INDAHL 1,465,272

TYPOGRAPHIC BORDER MECHANISM

Filed April 1, 1922   2 Sheets-Sheet 1

INVENTOR
Mauritz C. Indahl
BY
John A. Ferguson
HIS ATTORNEY.

Aug. 21, 1923.

M. C. INDAHL 1,465,272

TYPOGRAPHIC BORDER MECHANISM

Filed April 1, 1922   2 Sheets-Sheet 2

INVENTOR
Mauritz C. Indahl.
BY
John A. Ferguson
HIS ATTORNEY

Patented Aug. 21, 1923.

1,465,272

UNITED STATES PATENT OFFICE.

MAURITZ C. INDAHL, OF PHILADELPHIA, PENNSYLVANIA, ASSIGNOR TO LANSTON MONOTYPE MACHINE COMPANY, OF PHILADELPHIA, PENNSYLVANIA, A CORPORATION OF VIRGINIA.

TYPOGRAPHIC BORDER MECHANISM.

Application filed April 1, 1922. Serial No. 548,812.

*To all whom it may concern:*

Be it known that I, MAURITZ C. INDAHL, a citizen of the United States, and a resident of Philadelphia, county of Philadelphia, State of Pennsylvania, have invented certain new and useful Improvements in Typographic Border Mechanisms; and I do hereby declare the following to be a full, clear, and exact description of the same, reference being had to the accompanying drawings, forming part of this specification, and to the characters of reference marked thereon.

This invention relates to mechanism for the production of typographic elements and particularly to mechanism of this kind in which a mold, within the cavity of which the element is cast from molten type metal, is adapted to co-operate with a matrix or other device for closing one side of the mold and giving form to a portion of the element, such matrix being moved alternately to close the mold during the formation of the element and lift free to a removed position during the ejection of the element to permit of such ejection. As an example of mechanism of this class, reference may be made to United States Letters Patent 1,220,059 dated March 20, 1917.

The objects of the invention are principally to produce a mold construction embodying a guide for the matrix during its full stroke or movement whereby the said matrix is positioned with the utmost accuracy, and to produce an operating mechanism for the matrix so connected with the matrix and co-operatively related thereto that the mold closing pressure for the guided matrix is delivered thereto in such manner as to insure a proper positioning thereof. Other objects will be specifically pointed out or will otherwise appear hereinafter in connection with the following description of the mechanism shown in the drawings in which, Fig. 1 is a side elevation of a mold and associated mechanism for producing printers' strip material and embodying the present invention.

Figure 1:
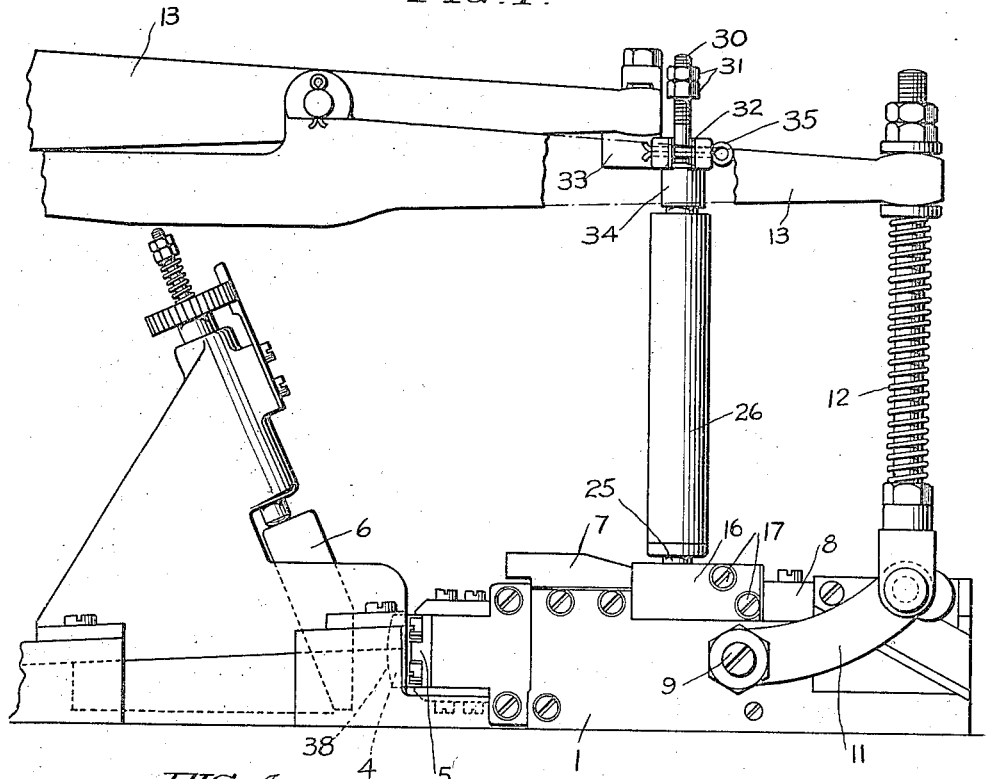

The mold and related parts, shown in the drawings, is in its general construction similar to the well known improved fused strip producing mold manufactured and sold by Lanston Monotype Machine Company for use in conjunction with the type casting machines also marketed by said company. This mold is disclosed generally in United States Letters Patent No. 1,222,415, dated April 10, 1917, and is thoroughly known to those skilled in the art. It is not deemed necessary, therefore, to describe this mold and associated mechanism in detail, but certain parts shown in the drawings will be referred to for identification purposes, for example, the base plate 1, supporting the side blocks 2 and 3, the mold blade 4 reciprocated between the blocks and above the base plate to come against the stop 5 on its forward or ejecting movement and against the micrometer stop 6 in its rearward movement, the tie blocks 7 and 8, the pressure screw 9 operated in timed relation to the movement of the mold blade and to the molten metal injection through the nozzle opening 10, by means of the lever 11, the yielding connecting rod 12 connecting said lever with the centering pin actuating lever 13 of the casting machine or an extension of the same.

Figure 5:
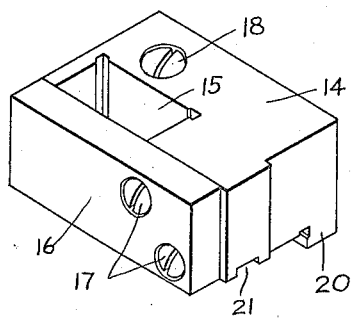
Fig. 5 is a perspective view of the guide block of the mold.

In accordance with the present invention the mold is provided with a matrix guide which in the form illustrated consists of a built-up structure separable from the mold. This matrix guide is shown particularly in Fig. 5 and comprises a block 14 having an opening 15 therein to correspond in dimension with the length and width of the matrix. The opening 15 is closed on three sides by walls of the block 14 and on the fourth side by the closure block 16 secured to the block 14 by the screws 17. The opening, as shown, is rectangular and extends entirely through the guide block, its walls preferably being vertical when secured on the side block 2 by means of the screw 18 and its length and width corresponding with that of the matrix 19 in such manner that the matrix will be guided by all four walls of the guide block opening and will have an easy sliding fit in the opening. The depth of the opening corresponds with the thickness of the guide block and is sufficient so that in operaton the matrix will not lift away from its guide walls, but will contact therewith in all positions of the matrix. The block 14 is preferably formed with a lug 20 on its bottom to fit in a recess formed in the block 2.

Figure 4:
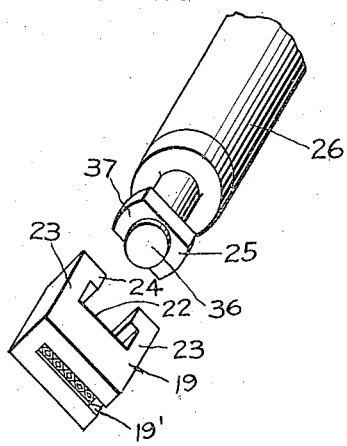
Fig. 4 is a perspective view showing in dissociated relation the matrix and a portion of the operating mechanism therefore.

The matrix 19 is, as shown, in the form of a rectangular block having a bottom or a portion thereof adapted to seat on the side blocks and close the top of the casting cavity formed by walls of the blocks constituting the mold In said bottom surface may be formed, as shown in Fig. 4, a fancy or a straight line design driven or otherwise sunk in the block, or the matrix may be otherwise formed, it being understood that its function herein is to close one side of the mold and to give form to a portion of the typographic element being produced. When there is a drive in the matrix said drive may be sloped or slanted, as shown Fig. 2, to compensate for shrinkage in a manner well understood, and as is disclosed in United States Letters Patent 1,256,806 dated February 19, 1918. The block 14 is preferably grooved at 21 to allow of the removal of the strip without rubbing against the block and destroying the face of the strip which was cast within the drive.
This groove is not necessary if a flat matrix is used or one which projects into the forming cavity, but in these cases, though not essential, the groove has no deleterious effect. Particularly in the case of a fancy design, the matrix is preferably provided with a slot 19′ or its equivalent, the bottom of said slot being at least as deep as said design, said slot extending from the design to the forward end of the matrix and its purpose being to mark accurately the degree of overlapping of the matrix design upon the strip previously cast, for facilitating the seating of the matrix upon the design formed on the strip in such manner as to provide a proper fit and to prevent injury to the design cast on the strip. The slot is of substantially the same width as the point size of the design and therefore retains the full seating surface of the matrix bottom on the mold side blocks. The top of the matrix is formed with a T-slot extending through the matrix from side to side in such manner as to form a flat pressure surface 22 substantially parallel with the bottom of the matrix and two upwardly and inwardly projecting fastening hooks 23 one at each end of the matrix, their upper flanges 24 projecting toward each other. A matrix actuating rod is adapted to connect the matrix with the centering pin lever 13. This rod consists of a T-shaped head 25 at the bottom for co-operation with the T-slot of the matrix, whereby the latter may be fastened to the actuating rod, said head being secured to a cylindrical casing 26 constructed, as shown particularly in Fig. 2, to hold a coiled spring 27 pressing at one end against the head and at the other against a plunger which is formed with an enlarged portion 28 to fit slidably within the casing and a reduced intermediate portion 29 corresponding with a reduced axial aperture in the upper end of the casing, whereby shoulders are formed to prevent the ejection of the plunger by the spring but allowing the compression of the spring by the plunger to force the casing and the head downwardly; the plunger is also provided with a further reduced upper portion 30 carrying a threaded upper end for the accommodation of adjusting nuts 31. This upper portion is adapted to be seated in a slot 32 in the bracket 33 secured to the centering pin lever 13 by suitable means. Between the lower portion of the bracket which is finished with a spherical surface, and the shoulder of the reduced portion 29 of the plunger is a washer 34 having a spherical upper surface to co-operate with the corresponding surface of the bracket. The upper portion 30 of the plunger may be retained in the slot 32 by the cotter pin 35.

The lower end of the head 25 of the matrix actuating rod is provided with a flat bottomed projection or pressure pad or face 36 to contact with the flat upper surface 22 of the matrix between the hooks: when the T-flange 37 of the head is positioned in the T-slot of the matrix there is allowed sufficient play or lost motion between the flange, the hook portions 24 and the surface 22 so that when the actuating rod is moved upward it does not carry the matrix with it until the flange has come in contact with these hook portions. It will also be noted that the centering pin lever 13, as it starts to rise, first allows the spring 27 to expand and move the plunger upward until its enlarged portion 28 comes in contact with the shoulder on the casing 26: further movement of the lever 13 is idle until the bracket 33 strikes the nuts 31 at which point the whole actuating rod is moved upward slightly, this movement first causing the flange 37 to contact with the matrix hook portions 24 and then causing the matrix to lift in its guide sufficiently to allow of the movement of the produced strip by the ejection action of the mold blade.

The rear end of the mold blade is preferably made arcuate at 38, as shown, so that it will have a point contact with the micrometer stop 6 and thus ensure extremely accurate positioning; the forward end may be provided with a step or projection 39, (Fig.

Figure 2:
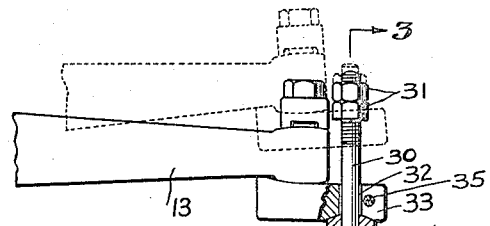
Fig. 2 is a vertical longitudinal section thereof, substantially on the line 2—2 of Fig. 3.
Figure 3:
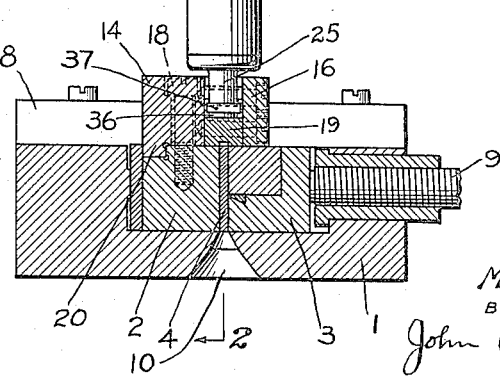
Fig. 3 is a vertical cross section substantially on the line 3—3 of Fig. 2.

2) to key down the metal so that there will be no tendency to cause the strip to lift with the matrix. The mold base 1 may be provided with a clearance cut 40, as shown in Fig. 2, so that the foot of the strip will not rub against the base sufficiently to cause a bending or bowing upwardly of the strip as it issues from the mold.

In the operation of the mechanism it will be understood that the forward wall of the mold cavity is formed by a portion of the strip produced, the rear or closure end thereof defining the forward end of the mold cavity at a time when the mold blade has been withdrawn by the usual mechanism of the casting machine, its limit of movement being determined by the position of the stop 6 against which the rear surface 38 of the mold blade abuts. The cast is made in the usual way by the pump mechanism of the machine, its nozzle (not shown) seating in the nozzle opening 10 and after the cast has congealed sufficiently, the matrix is lifted in the manner previously described and the mold blade is actuated to force the strip forwardly, the extent of movement being limited by the forward stop 5 which may be set to provide for the formation of either a fused or a non-fused strip as is clearly known to those skilled in the art. The mold blade is again withdrawn and the matrix positioned by the downward movement of the centering pin lever which allows the matrix to descend and subsequently, by acting through the washer 34 and the plunger, compresses the spring 27 and positions the matrix under pressure; the pressure pad 36 of the actuating rod head 25 distributes this pressure evenly since its flat face co-operates with the flat pressure surface 22 of the matrix. The matrix guide is fitted for easy movement with respect to the matrix and the latter is not likely to tilt or otherwise become displaced in the guide: a tendency to become tilted may, however, be brought about by improper seating of the forward end of the matrix on the rear end of the strip, or by other causes. In any such case the pressure of the actuating rod is applied by means of the flat, broad pressure face, 36 in preponderating degree, as will readily be understood, to that portion of the matrix which tends to seat improperly: the result is to a high degree definite and accurate positioning of the matrix.

When the lever 13 is up and the spring 27 is not under tension, the matrix may be removed for replacement by the simple manual operation of removing the cotter pin 35, pulling the plunger laterally out of its slot and lifting the actuating rod and matrix out of the guide for the latter. The matrix may be slid off the T-head and replaced by another, if desired, and then assembled for operation by introducing the matrix into the guide aperture and slipping the plunger into its slot 32 in which it may be retained by replacing the cotter pin.

I claim:

1. Typographic mechanism comprising mold walls forming a casting cavity, a matrix for closing one side of said cavity and for giving form to a portion of the cast, an actuating rod connected with said matrix to move it alternately from mold closing position to a removed position for permitting ejection of the cast, means for causing ejection of the cast, and a matrix guide forming a structural part of the mold and having walls in slidable contact with the side walls of the matrix to guide the latter in all positions thereof.

2. Typographic mechanism comprising a mold within which a typographic element is produced from molten type metal, a matrix for closing one side of the mold and for giving form to a portion of the element, said matrix being provided with a T-slot to form a flat pressure surface and with upwardly extending hooks, a guide for said matrix and an actuating rod comprising a spring box and a T-shaped head, the latter being adapted to fit loosely within the T-slot of said matrix and having a pressure face and lateral flanges to co-operate respectively with the pressure surface and the hooks of said matrix.

3. Typographic mechanism comprising mold walls forming a casting cavity, a matrix for closing one side of said cavity and for giving form to a portion of the cast, said matrix being provided with a T-slot to form a flat pressure surface and upwardly extending hooks, a matrix guide forming a part of the mold and having walls in slidable contact with the side walls of the matrix to guide the latter in all positions thereof, and an actuating rod to move the matrix alternately from mold closing position to a removed position for permitting ejection of the cast, said rod comprising a spring box and a T-shaped head, the latter being adapted to fit loosely within the T-slot of said matrix and having a pressure face and lateral flanges to co-operate respectively with the pressure surface and the hooks of said matrix.

4. Fancy border strip mechanism comprising a printers' strip producing mold having walls forming a casting cavity, the forward side of said cavity being open and being adapted to be closed by a portion of the strip produced whereby a cast in the cavity is defined at its forward end by the closure end of said strip, a matrix for seating over and closing the top of the cavity and having a fancy design on its underside, means for alternately lifting and seating the matrix, said last mentioned means comprising a spring box actuating rod connected with the matrix by a T-head and T-slot connection, and a guide forming a part of the mold and having guide walls for all sides of the matrix, said guide walls being of sufficient depth to contact with the sides of the matrix in all positions thereof.

5. A fancy design strip matrix comprising a rectangular block provided with a flat pressure surface and upwardly and inwardly projecting fastening hooks, a flat bottom surface substantially parallel with said pressure surface, a fancy design sunk in said bottom surface and a slot at least as deep as but of substantially the same width as the point size of the design and extending from the design to the forward end of the matrix.

MAURITZ C. INDAHL.